(No Model.) 2 Sheets—Sheet 1.

M. JENSEN.
SOLDERING MACHINE.

No. 550,176. Patented Nov. 19, 1895.

Witnesses,
G. H. Nurse
H. F. Ascheck

Inventor,
Mathias Jensen
By Dewey & Co.
Attys (No Model.) 2 Sheets—Sheet 2.
M. JENSEN.
SOLDERING MACHINE.

No. 550,176. Patented Nov. 19, 1895.

Witnesses,
Inventor,
Mathias Jensen
By Dewey & Co.
Attys

UNITED STATES PATENT OFFICE.

MATHIAS JENSEN, OF ASTORIA, OREGON, ASSIGNOR OF ONE-HALF TO THE JENSEN CAN FILLING MACHINE COMPANY, OF SAME PLACE.

SOLDERING-MACHINE.

SPECIFICATION forming part of Letters Patent No. 550,176, dated November 19, 1895.

Application filed August 13, 1895. Serial No. 559,153. (No model.)

*To all whom it may concern:*

Be it known that I, MATHIAS JENSEN, a citizen of the United States, residing in Astoria, Clatsop county, Oregon, have invented an Improvement in Soldering-Machines; and I hereby declare the following to be a full, clear, and exact description of the same.

My invention relates to improvements in machines for soldering cans.

It consists in a means of removing the surplus solder from the end seams of cans and a means of preventing the solder from becoming cold or "freezing," as it is technically called, before it has been removed.

Figure 1:
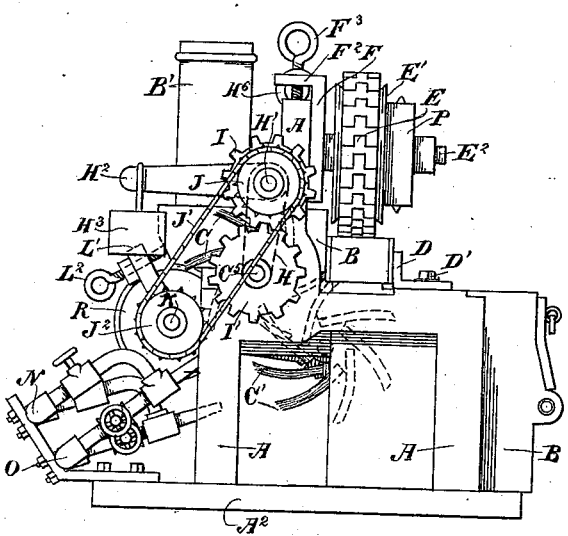
Figure 4:
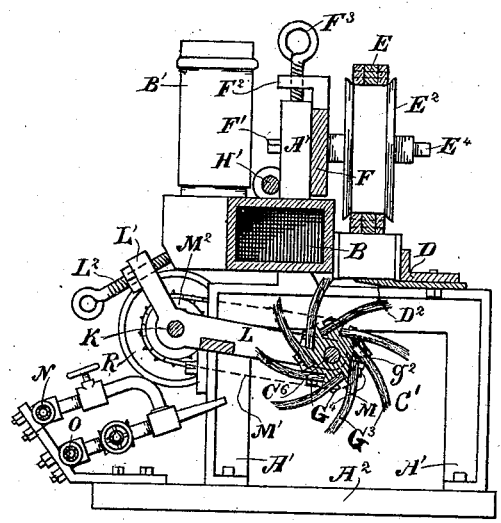
Figure 5:
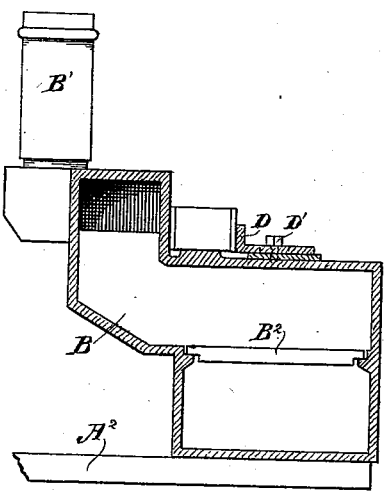
Figure 2:
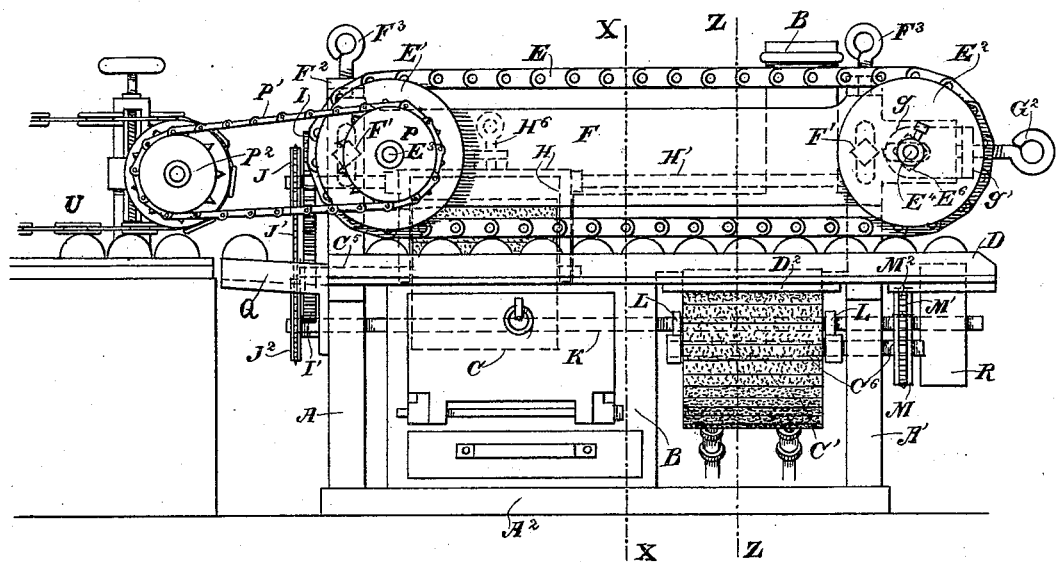
Figure 3:
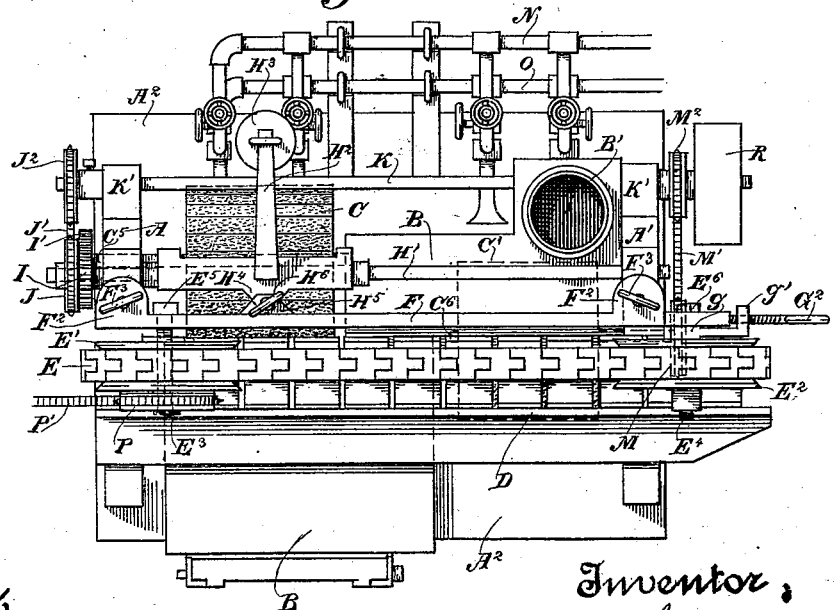

Referring to the accompanying drawings for a more complete explanation of my invention, Figure 1 is an end view of my device. Fig. 2 is a side elevation showing a part of the rear end of the soldering-machine and the connection between the two. Fig. 3 is a top view. Fig. 4 is a section taken through the line Z Z of Fig. 2. Fig. 5 is a section of the heater and parts taken on the line X X of Fig. 2.

The framework of my machine consists of a base $A^2$, having legs A and A'. Upon this frame is mounted a fire-box B, so formed that the cans may be rolled over one of its plates and thus kept hot while the surplus solder is removed from the ends by a wiper C, after which the ends are engaged while the surplus solder is removed from the sides of the seams by a wiper C'. This fire-box or furnace fits against the legs A', to which it is fastened in any suitable manner, and it is provided with a pipe B' to carry off the smoke.

Fire is made within the heater upon grate-bars $B^2$. An angle-plate D is clamped to the legs by bolts D'. This plate serves to guide one end of the cans. The bolts D' pass through oblong holes in the angle-plate and thus permit the plate to be adjusted for different lengths of cans. Another plate $D^2$ is bolted to the lower part of this angle-plate and projects beneath the cans, so as to support them while they are passing the wiper C', which removes the solder from the sides of the seams. The cans, after being soldered in any well-known or suitable machine, as shown at U, are delivered by means of an inclined chute Q upon the wiping-machine.

This machine is provided with a heavy endless chain E, which passes around two horizontally-journaled pulleys E' and $E^2$. These pulleys are mounted loosely upon their axles $E^3$ and $E^4$. The axle $E^3$ is fixed in a bar F and secured by a jam-nut $E^5$ upon its end. The axle $E^4$ passes through an oblong hole in the bar F and is clamped to the latter by a jam-nut $E^6$. A strap $g$ with an angle $g'$ is fixed to the bar F and its upturned end is screw-threaded to receive the screw $G^2$. This screw when turned acts to move the axle $E^4$ and with it its chain-drum, so that the chain E may be tightened or loosened by first loosening the jam-nut $E^6$ and then turning the screw $G^2$.

In order to raise or depress the pulleys and chain to suit different diameters of cans, I have shown a bolt F' passing through an oblong hole in each of the two upright arms of the legs, this bolt being screw-threaded and turning in corresponding threads in the bar F. This latter bar has an angle-plate $F^2$, through which passes a screw $F^3$, the lower end abutting against the upper end of the upright arm of the leg, so that when turned it will either raise or depress the chain and its drums whenever the bolt F' is loosened for that purpose. After the adjustment has been properly made, the bolt can be again tightened to secure the parts in the new position. Two wipers are employed in this apparatus, one of which rotates against the end of the can while the latter is passing, and after this wiper has finished its work the can is moved into contact with the second wiper, which is situated out of line with the first one, and this second wiper removes the solder from the side of the seam. The can rolls upon the top of the furnace or heater with its end exposed while the first wiper is doing its work, and afterward, leaving the top of the furnace, it rolls upon the plate or extension $D^2$, which supports it while the end which has already been cleaned rolls in contact with the side of the furnace, so that it is kept heated while the second wiper removes the solder from the side of the seam which projects beyond the supporting-plate $D^2$. These wipers are each of such length that the can will make a full revolution while passing either of them, and thus expose the whole length of the seam to their action successively. The wipers consist of hubs $g^2$, having the leaves $G^3$ fastened to them by screws $G^4$. The leaves $G^3$ are made of cloth and each is supported by a light spring, of steel or other flexible material, on the opposite side from its wiping-surface. These springs are secured by the same screws $G^4$ that hold the leaves. The wiper C is secured to its axle $C^5$, which is journaled in the arms of a yoke H. This yoke is mounted loosely upon its axle or supporting-shaft H', which passes through holes in the upright arms or extensions of the legs A and A' and is fastened to these arms.

A gear-wheel I and a sprocket-wheel J are both fastened together and mounted to turn loosely upon the axle H'. The gear-wheel I meshes with another gear-wheel I', which is fastened on the end of the axle $C^5$, to which, as before stated, the wiper C is also fastened. The sprocket-wheel J is connected by a chain J' with another sprocket-wheel $J^2$, which is fastened to a shaft or axle K. This shaft or axle is journaled in the boxes K', one upon each of the legs A and A'. An arm $H^2$ projects from the yoke H and carries a weight $H^3$, which acts to hold the wiper C against the cans as the latter pass. The wiper may be adjusted to or from the cans by means of a screw $H^6$, passing through a projection $H^4$, which extends from the yoke under an angle $H^5$ of the bar F. The wiper C' is fastened to its axle $C^6$, which is journaled in the arms of a yoke L, and the latter is loosely mounted upon the axle or shaft K. This yoke has a projection L' extending upon the opposite side from the wiper, and through this passes a screw $L^2$, the end of which abuts against the fire-box B. By turning this screw this wiper may be adjusted to and from the cans as desired. Upon the axle $G^6$ is fixed a sprocket-wheel M, and this is connected with another sprocket-wheel $M^2$ by a chain M', so that the revolution of the driving-axle will be transmitted to both the wipers.

The wipers are kept damp by a light spray of steam and water conveyed through pipes N and O. A sprocket-wheel P is fixed to revolve with the pulley E', and by means of a chain P' it is connected with a sprocket-wheel $P^2$, secured to the pulley of the soldering machine, as shown in Fig. 2, so that the chain E is driven by power derived from the soldering-machine.

The operation of my machine will then be as follows: Power applied to the driving-pulley R revolves the wipers. The cans are delivered from the soldering-machine by the chute Q, over which they roll by gravitation until they arrive upon the top of the fire-box B, between the wiper C and the angle-plate D and beneath the chain E. This chain rolls the cans forward upon the top of the fire-box, thus keeping them heated and preventing the solder from becoming cold while the wiper C removes the surplus solder from the ends of the cans until they have made a complete revolution in passing this wiper. The cans then pass off this portion of the fire-box, and the wiped ends will engage the vertical upwardly-extending portion of the box, as seen in Fig. 5, thus leaving the under side of the seam exposed for the action of the wiper C', the plate $D^2$ supporting the can, which is thus rolled over it by the continued action of the chain, until the wiper C' has cleaned all the surplus solder from the lower portion or side of the seam. In this manner the ends and sides of the seams are wiped successively and the solder which is removed by either of the wipers will not be thrown upon the other, as they are not in line.

It will be manifest that the plate which prevents the solder from becoming cold may be heated by several well-known means and may be made in different forms to suit such means.

The cans may also be rolled through the wiping-machine by a continuation of the same chain which rolls them through the soldering-machine, this device being intended to illustrate a means for keeping the cans hot until the wiping is completed.

Where the seams are soldered without applying solder to the ends of the cans there will be no necessity for the end wiper.

It will be manifest that oval or angular cans, the ends of which are soldered in molten solder while the cans are moved or revolved by an endless carrier, may be wiped by this machine simply by bringing their seams into contact with the wipers by the same carrier and in the same manner as they are moved when being soldered.

The advantage of this invention is principally the prevention of the solidifying of the solder while the surplus is being removed by durable and inexpensive wipers, which are easily adjusted, and provide a free delivery of solder which they remove.

Having thus described my invention, what I claim as new, and desire to secure by Letters Patent, is—

1. The combination with an endless carrier adapted to revolve the cans, of revolving wipers rotating in contact with the soldered surfaces, and a heater or heaters with which the cans form contact after leaving the solder bath and while they are being advanced, whereby the solder is prevented from hardening.

2. The combination with an endless carrier to continuously revolve the cans forward, of oppositely revolving wipers out of line with each other adapted to wipe the ends and sides respectively and successively, without engagement with each other, whereby each wiper discharges the solder independently and clear of the other, and suitable means for actuating the carrier and wipers.

3. The combination with an endless carrier to revolve the cans, of a heated plate to engage the cans and prevent the solder thereon from stiffening, a revolving wiper to remove the solder from the end seams of the cans while so carried, revolved and heated, and means to actuate the carrier and wiper.

4. The combination of an endless carrier to revolve the cans forward, a heated plate to engage the cans, a revolving wiper to remove the solder from the ends of the cans while the heated plate is engaged with their sides, and a second revolving wiper to remove the solder from the sides of the cans, after the ends have been wiped.

5. The combination of an endless carrier to revolve the cans forward, of a heated plate in contact with which the cans are moved, revolving wipers mounted successively, one of said wipers being adapted to wipe the solder from the ends of the cans, and the other from the sides, and pipes adapted to convey a spray of steam and water upon said wipers, and mechanism whereby the carrier and wipers are actuated.

6. An apparatus for wiping the end seams of cans after they have been soldered, consisting of an endless traveling carrier adapted to rotate and advance the cans, a heated plate with which the side of the can forms contact while it is being advanced, a revolving wiper adapted to wipe the end of the can, which is presented thereto as it passes, a second heated plate with which the end of the can forms contact after having been wiped, and a support to retain the end of the can in contact with said plate as it advances, a second revolving wiper out of line with the first one, adapted to wipe the solder from the side of the can while the latter is rotated in contact with the wiper, and mechanism whereby the carrier and wipers are actuated.

7. A device for wiping the end seams of cans after they have been soldered, consisting of an endless traveling chain by which the cans are rotated and advanced, a heated plate in contact with which the sides of the cans travel, a wiper revolving in contact with the ends of the cans, adapted to remove the solder therefrom, a second heated plate with which the ends of the cans form contact after having been wiped, a second revolving wiper by which the solder is removed from the sides of the cans after the ends have been wiped, and a device whereby the wipers are moved to adjust them to larger or smaller cans, and to regulate their contact therewith.

8. A device for wiping the seams of cans after having been soldered, consisting of an endless traveling carrier by which the cans are revolved and advanced, a heated plate in contact with which the cans move during their advance after leaving the solder bath, revolving wipers forming contact successively with the ends and with the sides of the cans, whereby the solder is first wiped from the ends and then from the sides, and guides by which the cans are retained in position between themselves and the heated plates, as they are advanced over the plates and wipers.

9. A device for wiping the seams of cans after they have been soldered, consisting of an endless traveling carrier adapted to rotate and advance the cans, heated plates in contact with which the cans are rotated, revolving wipers whereby the solder is successively removed from the ends and the sides of the cans, said wipers consisting of curved, elastic arms projecting outwardly from a central hub, having their wiping surfaces composed of cloth or fabric, secured to said arms, so that the rotation of the wipers will force the wiping surfaces against the passing can bodies.

In witness whereof I have hereunto set my hand.

MATHIAS JENSEN.

Witnesses:
ELLA M. RUCKER,
G. C. FULTON.